United States Patent
Malinen

(10) Patent No.: US 12,003,265 B1
(45) Date of Patent: Jun. 4, 2024

(54) SYSTEM OF ON-BODY MOBILE DEVICES AND METHODS OF OPERATION WITH A FEMTOCELL

(71) Applicant: Eric James Malinen, Saint Cloud, MN (US)

(72) Inventor: Eric James Malinen, Saint Cloud, MN (US)

( * ) Notice: Subject to any disclaimer, the term of this patent is extended or adjusted under 35 U.S.C. 154(b) by 391 days.

(21) Appl. No.: 16/588,995

(22) Filed: Sep. 30, 2019

Related U.S. Application Data

(63) Continuation of application No. 15/808,764, filed on Nov. 9, 2017, now Pat. No. 10,469,114, which is a
(Continued)

(51) Int. Cl.
*H04B 1/3827* (2015.01)
*H04B 1/40* (2015.01)
(Continued)

(52) U.S. Cl.
CPC ............. *H04B 1/3838* (2013.01); *H04B 1/40* (2013.01); *H04B 17/23* (2015.01); *H04W 52/0261* (2013.01); *H04W 52/0277* (2013.01); *H04W 52/029* (2013.01); *H04W 52/288* (2013.01); *Y02D 30/70* (2020.08)

(58) Field of Classification Search
CPC ........ H04B 17/23; H04B 1/3838; H04B 1/40; H04W 52/0261; H04W 52/0277; H04W 52/029; H04W 52/288; Y02D 30/70; Y02D 70/12; Y02D 70/122; Y02D 70/124; Y02D 70/126; Y02D 70/142; Y02D 70/144; Y02D 70/146; Y02D 70/164; Y02D 70/26; Y02D 70/40
See application file for complete search history.

(56) References Cited

U.S. PATENT DOCUMENTS

2002/0039896 A1* 4/2002 Brown .................. H04W 48/04
455/419
2006/0105746 A1* 5/2006 Pirila .................... H04W 48/04
455/411

(Continued)

OTHER PUBLICATIONS

Ghadialy, "HeNBs (Femtocells) and eNBs Handovers", Sep. 27, 2010, the 3G4G Blog, https://blog.3g4g.co.uk/2010/09/henbs-femtocells-and-enbs-handovers.html (Year: 2010).*

*Primary Examiner* — Zhiyu Lu
(74) *Attorney, Agent, or Firm* — Albert W. Watkins

(57) ABSTRACT

A system of mobile devices that reduces the transmission strength of outgoing signals originating from a handheld device, and sends such signals to a second device. The second device communicates with the first device using low-power, short-range RF communication signals, and then generates and transmits high-power, long-range RF communication signals through a cellular tower to a remote recipient. When the first and second devices encounter a femtocell, the first device automatically switches directly to the femtocell, and the second device is either shut off or switched to a stand-by mode. The intelligence and power of the devices may be split between two or more devices, resulting in longer use time, deeper and more complex computing capability, and fewer disruptions due to power.

5 Claims, 2 Drawing Sheets

Related U.S. Application Data continuation of application No. 15/057,088, filed on Feb. 29, 2016, now Pat. No. 9,843,353, which is a continuation-in-part of application No. 12/929,307, filed on Jan. 13, 2011, now Pat. No. 9,306,681.

(51) Int. Cl.
*H04B 17/23* (2015.01)
*H04W 52/02* (2009.01)
*H04W 52/28* (2009.01)

(56) References Cited

U.S. PATENT DOCUMENTS

| | | | |
|---|---|---|---|
| 2007/0060107 A1* | 3/2007 | Day | H04M 1/72454 455/414.1 |
| 2008/0165829 A1* | 7/2008 | Lee | H04W 4/80 375/130 |
| 2011/0009097 A1* | 1/2011 | Sweeney | H04W 68/00 455/414.1 |
| 2011/0021188 A1* | 1/2011 | Tanaka | H04W 24/08 455/426.1 |
| 2012/0094668 A1* | 4/2012 | Vratskides | H04W 48/16 455/435.1 |
| 2012/0149351 A1* | 6/2012 | Kalbag | H04W 48/08 455/418 |
| 2015/0249494 A1* | 9/2015 | Sela | H04W 88/02 455/435.1 |

\* cited by examiner

SYSTEM OF ON-BODY MOBILE DEVICES AND METHODS OF OPERATION WITH A FEMTOCELL

CROSS REFERENCE TO RELATED APPLICATIONS

The present application is a Continuation of Ser. No. 15/808,764 filed Nov. 9, 2017 and presently allowed, which is in turn a Continuation of Ser. No. 15/057,088 filed Feb. 29, 2016 and granted as U.S. Pat. No. 9,843,353, which is in turn a Continuation-in-Part of Ser. No. 12/929,307 filed Jan. 13, 2011 and granted as U.S. Pat. No. 9,306,681, each of like inventorship, the entire contents and teachings which are incorporated herein by reference.

BACKGROUND OF THE INVENTION

1. Field of the Invention

The present invention pertains generally to telecommunications, and more particularly to a plurality of on-body mobile devices.

2. Description of the Related Art

Cellular telephones, laptop computers, and a wide variety of similar mobile devices use radio frequency (RF) radiation to connect to and/or communicate with other users, entities, and networks using the public switched telephone network, the Internet, private networks, public safety networks, and other transmission paths and networks. Studies on the effects of RF radiation to the human body have, for some time, been controversial and not, arguably, conclusive. Much difficulty has attended the building and use of newer and ever-larger and more comprehensive arrays of antennas such as cellular telephone "cell" antennas, and the production and use of ever-smarter and often more powerful and complex cellular telephones and other mobile devices.

As a result, mobile communication devices such as cellular telephones have recently evolved not only for the transmission of voice as was the original intent, but also for the transmission of text, data, and multimedia. Thus, a cellular telephone is a misnomer and such devices should more aptly be referred to as a wireless personal digital assistant (PDA) or a mobile computer. Due, at least in part, to this technological evolution, the use of mobile communication devices has increased exponentially.

Nevertheless, mobile communication devices continue to present problems. Many issues relate to the effects on children, and it is thought that, for all users, the most vulnerable body parts might be the brain, eyes, and groin. For example, one problem is the radiated electromagnetic fields that might affect a user's brain when hand-held devices are held in close proximity to the user's head. In order to address this problem, at least in part, the Federal Communication Commission (FCC) has set radio frequency (RF) exposure guidelines that recommend a maximum permissible exposure level. Specifically, the FCC has established a specific absorption rate (SAR) of 1.6 watts per kilogram (W/kg) or less. The term SAR as used herein is the amount of energy of an electromagnetic wave transmitted by a wireless transceiver, such as a mobile telephone, during a phone call and absorbed by a specific part (especially, a head) of a human body for six minutes, and is measured as an average over a 10-gram cube of a human tissue.

Despite communication companies developing devices that are in compliance with the FCC guidelines, there is a growing concern that health problems (such as brain cancer) might be attributed to use of the aforementioned mobile communication devices.

To address concerns over the amount of energy of electromagnetic waves transmitted by wireless transceivers, various studies have been performed to analyze the electromagnetic interaction of handset antennas and a user. These studies have resulted in suggestions for an improved design of the handset antenna. In addition, proposals exist for attempting to solve the absorption by a user's body, and its health consequences, such as brain cancer. See U.S. Pat. No. 7,031,657 to Tehrani and U.S. Patent Application Publication No. 2010/0159916 to Ezer at al. that both use an intermediate transceiver between a mobile device and a main antenna of a cellular telephone network that operates at a different frequency/intensity than the mobile device.

Shielding devices are also used in an attempt to reduce radiation, and many patents have been issued that include an antenna shield. See U.S. Pat. No. 6,075,977. However, due to proximity of the antenna to the user's body, the radiation problem still exists. In addition, the shield might adversely affect reception of the antenna, which could lead to an increase in absorption of energy because the cellular telephone attempts to compensate for the reduced reception. Thus, shielding by itself is not necessarily an optimal solution for radiation exposure.

Accordingly, alternative solutions have been proposed in an attempt to reduce radiation exposure. As is recognized in the art, the farther away the user's body is from the antenna, the less power absorption by the user's body. Thus, many prior art solutions propose to increase the distance between an antenna and the user. This approach is somewhat helpful to reduce the radiation absorbed by the user by increasing the distance between the user and the antenna. This is often achieved using a short wire, which limits the positioning of the handset with a maximum distance of arm's length to the brain. Alternatively, a wireless headset might be used, which lets the user roam around the office with the headset using short-range communication such as Bluetooth™ technology. However, most of these systems are not practical for a user walking in the street, for example.

However, none of the above mentioned references improve the performance of the mobile electronic devices that use long-range radio frequency (RF) communication, while reducing the SAR level at the head of the user of the mobile device.

Thus, there clearly exists a need for an efficient, yet compact and simple device capable of retransmitting RF communication signals received from mobile electronic devices that improves the performance of the mobile devices, and also reduces the SAR of such mobile devices at the head of the user.

SUMMARY OF THE INVENTION

A method and system are presented to reduce the radiation absorbed by the head of the user of mobile or wireless computing or communication devices, such as cellular telephones, and push this radiation down or away from the upper portion of the body such as the head (brain and eyes) and extending as far down as, for example, the groin, toward an extremity such as a foot or ankle so that the usage of these mobile devices become safer for the users.

One embodiment pushes RF radiation systematically toward the feet and ankles, or at least toward the lower extremities, and adds the use of one or more "lower" devices to the current use of the "upper" mobile device or devices (current and future cellular telephones and smart phones, mobile computers, etc.). The lower devices might be connected to the lower body using clips, hook and loop-type fastening straps, or other fasteners, which can be permanent or removable, or might be otherwise attached to, or built-in to, clothing, or even attached more permanently to the lower body. The "lower" devices might also be temporarily set aside while being used (away from the body), to provide even greater protection. Preferred embodiments provide, at least in part, a systematic and effective way to reduce RF radiation while permitting the "above" device or devices to operate in much the same way that existing cellular telephones operate today, and to provide greater flexibility in the development of future "above" uses, devices, and means of operation.

Another embodiment might provide added power and capabilities, beyond what is currently available, in appropriate contexts. For instance, FCC regulations concerning the maximum permissible RF radiation exposure to the body (the "specific absorption rate (SAR)") permit a larger maximum for, e.g., feet and ankles. In one embodiment, significant power transmissions of the subject wireless system are pushed downward to take advantage of this larger maximum SAR, to achieve greater transmitting power and overall capabilities. Another embodiment takes advantage of a similarly increased maximum when devices are used in the "occupational/controlled" context, which yields the highest permitted SAR for on-body use (Federal Governmental use, including military, may go higher yet). In this context, it can be noted that the U.S. military is currently considering the use of off-the-shelf "smart phones" in combat, yet is faced with power/reception and capabilities limitations. A proposed embodiment could assist in overcoming these problems while keeping troops potentially safer.

Should a mobile device user choose to operate a device according to one of the disclosed embodiments, other significant benefits might be achieved, as described more fully below. In brief, splitting-up or duplicating capability between the upper device or devices, and the lower device or devices, can yield benefits currently unavailable. For instance, the overall, combined power of the devices (from batteries, solar, locomotion, etc.) may be increased, as the devices share functions. For example, the upper device(s) might take and process photos, while the lower device(s) store(s) the photos. Another additional benefit might be the use of safety/security alarms and shut-offs, where the upper and/or lower devices would, for example, alert the user that the upper device is being used in full-power mode, or that one device has been separated from the others beyond a predetermined distance, or that the battery level of a device is too low. Sophisticated, automatic functions might be created, such as having the lower device go into emergency text-only mode when the upper device has almost run out of power. Receipt of signals can also be more effective, as multiple receipt sites are used. With future advances in miniaturization, power, capability, and functioning on all fronts being inevitable in the context of mobile devices, the added use of one or more lower coordinated or synchronized devices will allow such advances to be fuller, and more readily available.

In one embodiment, a mobile system is used to push downward radio frequency (RF) communication signals generated by at least one mobile electronic device toward a lower portion of a body of a user of the at least one mobile electronic device in order to lower RF radiation exposure at an upper portion of the body of the user. The system includes a first transceiver in the at least one mobile electronic device and arranged to be placed adjacent to the upper portion of the body of the user; and a second transceiver that communicates with the first transceiver, the second transceiver is on the body of the user at a position lower than the first transceiver. The first transceiver is configured to establish RF communication with the second transceiver using low-power, short-range RF communication signals, and the second transceiver is configured to boost a signal strength of the short-range RF communication signals to high-power, long-range communication signals that are up to or above permissible specific absorption rate (SAR) levels as established by the Federal Communication Commission (FCC) and then to retransmit the long-range RF communication signals to a wide area network, so that the RF radiation exposure at the upper portion of the body of the user is reduced.

BRIEF DESCRIPTION OF THE DRAWINGS

Other embodiments and variations/details are described, by way of example, with respect to the following detailed description taken in conjunction with the accompanying figures, in which.

DESCRIPTION OF THE PREFERRED EMBODIMENT

Figure 1:
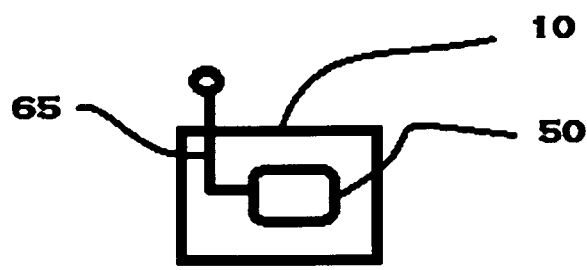
FIG. 1 shows a transceiver according to an embodiment.

Below is described embodiments for a solution for any mobile, wireless, remote-access, or satellite-access phone, cellular telephone, communication device, computation device, pager, radio, personal digital assistant (PDA), gadget, global positioning system, hand-held device, appliance, personal computer (PC), computer, laptop computer, tablet, netbook, reader, any one-way or two-way communication system, hand-held gaming device, mobile gambling device, geosynchronous position system (GPS) device, satellite emergency line, navigation device, tracking device, broadcasting device, or narrowcasting device, or any other known mobile electronic device 10, as seen by way of example in FIG. 1. Such device might include a transmitter, a receiver, or a transceiver 50 and at least one antenna 65.

Disclosed are methods and systems to decrease the radiation absorbed by a head of the user. As noted above, radiation absorption is typically measured based on specific absorption rate (SAR). The SAR is a value that corresponds to the relative amount of radio frequency (RF) energy absorbed in the head of a user of a wireless handset. The FCC limit for public exposure from cellular telephones is a SAR level at the head of 1.6 watts per kilogram (1.6 W/kg). Although the limit is 1.6 W/kg, nevertheless, the below embodiments are meant to encompass from just above zero to 1.6 W/kg, unless otherwise described.

Figure 2:
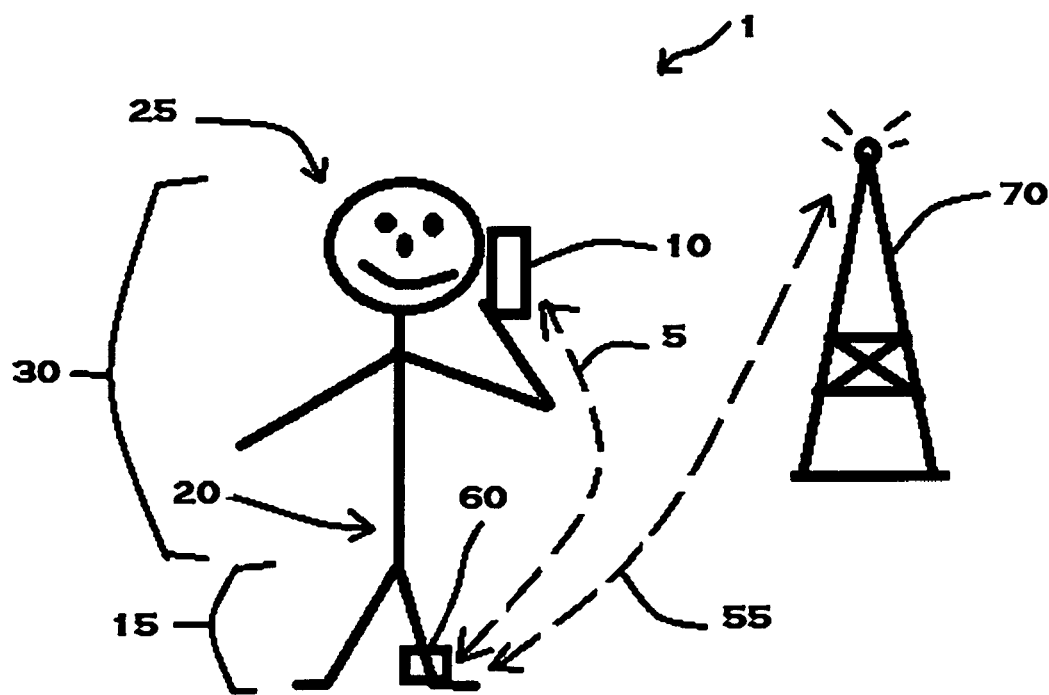
FIG. 2 shows a system according to an embodiment.

In one embodiment, as depicted by way of example in FIG. 2, a mobile system 1 is described that pushes downward RF communication signals 5 generated by at least one mobile electronic device 10 toward a lower portion 15 of a body 20 of a user 25 of the at least one mobile electronic device in order to lower RF radiation exposure at an upper portion 30 of the body 20 of the user 25. The upper portion includes an area between the groin and the head as seen in FIG. 1. In accord with step 110 of a method of operation 100 illustrated in FIG. 3, a first transceiver 50 (see FIG. 1) of the at least one mobile electronic device 10 is configured to be placed on or adjacent to the upper portion 30 of the body 20 of the user 25 and might be a hand-held device such as a cellular telephone. A second transceiver 60 communicates with the first transceiver 50. In one embodiment, the first transceiver 50 is a conventional cellular telephone that is modified in order to communicate with the second transceiver 60 and might include a switch in order to operate as a conventional cellular telephone (without using the second transceiver 60). Thus, in one embodiment, the first transceiver 50 includes all the features of a conventional cellular telephone including at least a camera, display, speakers, circuitry/software for computing and Internet access, adequate internal power (e.g. battery), microphone and circuitry/software for voice activation, and might be modified to include a switch or setting to permanently or by default (that is changeable by a user) communicate with the second transceiver 60.

The second transceiver 60 is configured to be directly on the body 20 of the user 25 or at a small distance (about one inch or less) from the body 20 at a position (lower portion 15 between the groin and the feet including lower extremities) lower than the first transceiver 50. The second transceiver 60 might be connected to the lower body using clips, hook and loop-type fastening straps, or other fasteners, which can be permanent or removable, or might be otherwise attached to, or built-in to, clothing, or even attached more permanently to the lower body. The first transceiver 50 (in the FIG. 2 embodiment) is configured to establish RF communication with the second transceiver 60 using low-power, short-range RF communication signals 5 as illustrated in step 120 of FIG. 3. The second transceiver 60 (in the FIG. 2 embodiment) is configured to boost a signal strength of the short-range RF communication signals 5 to high-power, long-range communication signals 55 that are up to or above permissible specific absorption rate (SAR) level limits as established by the Federal Communication Commission (FCC) and then to retransmit the long-range RF communication signals 55 to a wide area network or cellular tower 70 as illustrated by step 130 in FIG. 3, so that the RF radiation exposure at the upper portion 30 of the body 20 of the user 25 is reduced. As discussed above the permissible SAR level limit at the head is 1.6 W/kg.

For example, for a two-stage case, between the first transceiver 50 and the second transceiver 60 (see FIG. 2), the initial transmission link might be at a relatively low power, for a relatively short range, for example, a chosen or default maximum range of 10, 20 or 30 feet. Therefore, the first transceiver 50, which in the embodiment of FIG. 2, is on or adjacent to the user's head, might have an extremely low power, which is defined as not exceeding a radiated power of 120 milliwatt (mW). Common examples of such low-power, short-range RF communication signals include, but are not limited to, those signals that conform to the Bluetooth™ RF communication standard, signals that conform to the Wibree™ RF communication standard, and signals that conform to the WiFi RF communication standards. As discussed, the first transceiver might use transmissions that are other than short-range RF communication signals.

Figure 3:
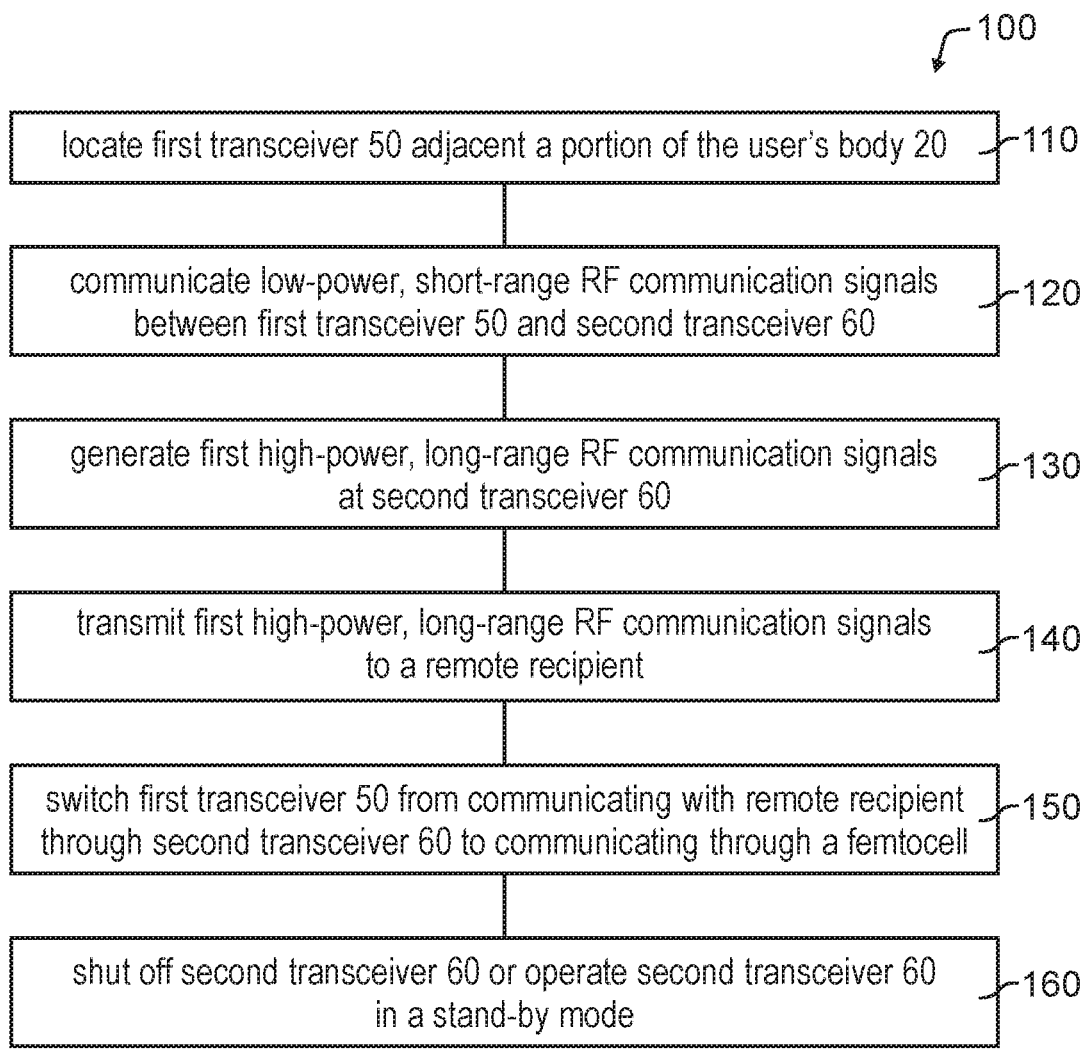
FIG. 3 illustrates a method of operation with a femtocell according to an embodiment.

Then, the second transceiver 60 (or last transceiver) transmits the data to a cellular tower 70 at a relatively high power as illustrated in step 140 of FIG. 3, possibly even an increased power as compared to a conventional cellular telephone (that is, with a conventional cellular telephone currently at up to a permissible 1.6 W/kg). The term cellular tower as used herein is not meant to limit the disclosed embodiments and rather, as recognized by one of ordinary skill in the communications art, a cellular tower might include any device that is capable of transmitting/receiving high-power, long-range communication signals that are in excess of 120 mW and that conform to, for example, the CDMA wide area cellular telephone network communication standard, GSM wide area cellular telephone network communication standard, any one of the International Telecommunication Union (ITU) wide area cellular telephone network family of standards developed under the International Mobile Telecommunications program (IMT-2000) including 2G, 2.5G, 3G, 3.5G, and 4G standards, and WiMAX wide area network RF communication standard. Similarly, the term cellular tower is meant to encompass any remote location or recipient of the signals.

As discussed above, increasing the distance between the user's head and the second transceiver 60 operating at a power up to or above 1.6 W/kg, the power absorption by the user's head is decreased drastically (by many orders of magnitude), which means relatively safe operation of the cellular telephone by the user. In the embodiment of FIG. 2, the user is standing and holding the first transceiver 50 in the embodiment of a cellular telephone on or adjacent to his ear and the second transceiver 60 is around the user's ankle. However, alternative embodiments are envisioned including the first transceiver 50 as a cellular telephone held in the user's hand at a distance from the head while the user is standing; held at a distance from the user or in a lap of the user while the user is in a seated position. Alternatively, the first transceiver 50 might be in the form of a personal computer placed in front of the user when the user is in a seated position. The second transceiver 60, which may also comprise a cellular telephone or other type of transceiver, would then be in any lower position, including on or near the ankle, on or near the foot or attached to a part of the leg such as the knee or thigh, or any other portion of the body that might be considered as an extremity including the arms and legs. Extremities such as the wrists and ankles as noted below are permitted by the FCC for much higher SAR level limits than those adjacent to the head. Consequently, for the purposes of the present disclosure, the terms "upper" and "lower" may not actually correspond to relative vertical distance from the ground, but will rather be understood herein to be indicative of systematic distance from the head and perhaps groin.

Further, there are many embodiments discussed herein below for which the inventive features are applicable independent of whether there is any RF exposure differential. In such instances, "upper" and "lower" will be understood to simply identify different body locations, entirely independent of actual relative vertical distance from the ground. Consequently, a first transceiver 50 that is wrist-worn may be referred to as "upper," while a second transceiver 60 that is also wrist-worn may be referred to as "lower" herein below. Furthermore, the movement of signals and information may be in any direction, from any transceiver to any other, the direction which will be determined at the time of design as will be understood by the designer.

In some embodiments herein, the second transceiver 60 might be attached to an article of the user's clothing, such as a trouser leg, a leg of a pair of shorts, or on a sock or shoe. Such embodiments depict typical uses and show how the proposed system systematically lengthens a distance from, for example, the brain and potentially harmful RF radiation.

However, the FCC allows different limits at different parts of the body. Specifically, at the extremities such as the foot or ankle, the SAR level limit can be as high as 4 watts per kilogram (4 W/kg) for personal use devices such as cellular telephones ("general population/uncontrolled exposure"), and as high as 20 W/kg for devices for certain commercial uses ("occupational/controlled" contexts). In the latter use, the level at the brain is also higher (8 W/kg). As noted previously, Federal Governmental use (e.g. military) might be even higher; such use would not be regulated by the FCC and Federal frequencies could be utilized.

Thus, it would be permissible to increase the SAR value above 1.6 W/kg for transmission away from the head. This might be accomplished by using an embodiment wherein transmission occurs in two (or more) stages, as in the embodiment of FIG. 2, described above with a transmission having a SAR level of about 4 W/kg.

In one embodiment, for either the 1.6 W/kg transmission or for higher transmission levels, this concept can be extended to multiple, more than two transceivers. Either two or more first transceivers 50 or two or more second transceivers 60, or even two or more first transceivers 50 and two or more second transceivers 60. In one preferred embodiment, all transceivers are in a network, and cover an area. In another preferred embodiment, the transceivers are positioned in parallel, and transmit and/or receive the data in parallel. In another preferred embodiment, the transceivers are positioned in series, for example, to extend the range of reception or to overcome a physical barrier, in which case the last transceiver is the one sending/receiving the data to the cellular tower. In another embodiment, different power can be used for each part of the transmission. In yet another embodiment, the first transceiver 50 includes a switch that enables direct communication between first transceiver 50 and cellular tower 70 using long range communication. In this embodiment, and when the switch is configured for direction communication, first transceiver 50 will operate like a conventional cellular telephone. Preferably, each transceiver is provided with a switch to turn the transceiver on or off, allowing a person to select whether each individual device is powered.

As described above, the second transceiver 60 might be on or slightly spaced from the body. This might be accomplished using any known filter, shield, or buffer, including shields that can be selected such that one frequency can be filtered, but not the others (selective shielding/filtering based on different frequencies and different materials). Such filter, shield, or buffer could somewhat or largely protect, for example, the ankle from RF radiation emanating from transceiver 60.

Furthermore, second transceiver 60 may be provided with two or more distinct transmission antennas. In accord with one embodiment, a first antenna suitable for communication with first transceiver 50 may preferably be directional. Since the location of first transceiver 50 is known and is located within a relatively small portion of a sphere relative to transceiver 60, a directional antenna may generate a transmission pattern focused toward first transceiver 50. Use of a directional antenna will reduce the amount of power required for reliable transmission between the two transceivers.

Similarly, second transceiver 60 may also be provided with a directional antenna to transmit relatively high power signals to a remote transceiver or tower. Once again, a directional antenna may be used to avoid transmission of significant power towards the upper body, while improving the transmission to a remote transceiver or tower. In addition, transmission shields may also be used to block higher power radiation from reaching selected areas of the user's body.

Additional benefits arise from a lower location for second transceiver 60. In-floor or adjacent to floor network transceivers will communicate with a lower leg-mounted transceiver at a lower power level, and in the process can drastically reduce the radiant energy at or near the upper body of any persons in the vicinity.

In one embodiment, the first transceiver 50 may also be provided with an RF power monitor operative to track the amount of RF energy received in the vicinity of the upper body of a user. In a further embodiment, in the event this tracked RF energy level exceeds a threshold value, and where the offending source is another device in the inventive system, that offending device may be controlled within the system to reduce power emissions to a safer level.

The communication between transceivers, components, or subsystems can be in any form, such as wired, wireless, or any combination of those, using electromagnetic radiation of any wavelength (such as visible light, laser, invisible light, X-ray, ultra-violet, infra-red, or pulsed light) or any other types of data communication means (such as sound waves or magnetic). In one embodiment, the use of non-RF alternative communications may provide an additional secure communications channel between devices within the system. Likewise, combinations of lights, colors, intensities, and illumination on-off patterns and timings may together be used not only for within-system communications, but also in one embodiment to serve the function of a security badge or pass key.

The communication can be for any kind of information, data, or code (such as text, voice, music, financial information, computer codes, executable codes, multimedia, video, Morse codes, encrypted data, unencrypted data, compressed data, uncompressed data, computer commands, real-time gaming or gambling, or fund transfers). The transceivers might include any kind of antennas 65, such as retractable, with extension, outside-of-the-housing, inside-of-housing, straight, curved, zigzag-patterned, square-patterned, circular-patterned, in array-form (multiple antennas), micro-antenna, on-substrate, on-chip, with spring-action, spiral/ring/coil-shaped, helical-shaped, dish-shaped, directional, non-directional, focused, multi-frequency, on-the-car, in-the-car, inside-the-glass, attached-to-a-balloon, on-a-helmet, on-a-watch, on-a-toy, on-a-robot, on-the-ear, in-the-ear, ear-piece, head-set, regular (conventional) handset, on-umbrella, on-eyeglasses (or their frames), on-another-antenna, inside-the-transceiver, hidden, or in (or on, or in the shape of) any one-dimensional, two-dimensional, and three-dimensional structures.

In one embodiment, the keypad, keyboard, number pad, mouse, speaker, microphone, display, LCD, or screen might be on first transceiver 50, second transceiver 60, or both. As will be apparent to those skilled in the art, since both first transceiver 50 and second transceiver 60 are transceivers and therefore transmit and receive, providing a microphone, speaker, and keypad, keyboard, number pad, or other equivalent apparatus in both transceivers can enable both of these transceivers 50, 60 to be independently operated as a telephone. In such instance, either transceiver 50 or transceiver 60 may be used to originate a call to a remote telephone or receive a call from a remote telephone. Further, each such transceiver may be provided with a separate telephone number. Alternatively, the second and subsequent transceivers may be used to roll calls into, in the manner of a multiple line business exchange.

In an alternative embodiment, transceivers 50, 60 are operated as a single telephone comprising two discrete coordinated and synchronized devices. In this embodiment, the two transceivers 50, 60 may both receive the same telephone signal, and share the same telephone number. If one of the two fails to accurately receive the transmission, reception by the other of the transceivers will be used as the received signal. In this embodiment, the two transceivers 50, 60 may divide the functions as well. In an exemplary embodiment, one transceiver such as transceiver 50 for exemplary and non-limiting purpose, may communicate auditory information, while a second transceiver may be dedicated solely to a video component of the communication.

Where both transceivers 50, 60 are telephones, a number of additional options and capabilities may be achieved. Notifications and alarms, such as the notification of an incoming call, may be provided across all transceivers if so desired. The notification is not required to be of the same type across all devices, and instead will preferably be chosen to provide a better user experience. This may be determined in part by the location of the device, and also in part by the type of device. So, for exemplary and non-limiting purpose, it is conceivable that a first transceiver 50 will provide an audible notification, noting that this device is much closer to a person's ears, while a second transceiver 60 located about an ankle may for exemplary purposes provide a vibratory notification. Other transceivers may, for exemplary and non-limiting purposes, present a visual notification such as a message display, light, flashing light, or any other suitable notification.

In one embodiment, speakers are provided to more than one transceiver. For exemplary purposes, where there are several "upper" transceivers 50 each with a speaker, these speakers will then be controlled by the transceivers working in tandem. This embodiment enables the generation of stereophonic or more complex sounds, since the sounds can originate from more than one location about the wearer. In a similar manner, and where desired, each transceiver may also be provided with one or more microphones. In this instance, these microphones may be used to gather stereophonic or other more complex sound inputs.

In one embodiment, first transceiver 50 and second transceiver 60 might be configured so that some functions are done "below" and the power for these functions comes from a lower power device such as a lower battery or batteries. In this way, for example, the first transceiver 50 might include only a battery, a speaker, a display screen and possibly a camera, with all other functions done "below" in the second transceiver 60. Devices can gauge their respective power levels, and devices can warn when levels are low. With some intelligence features done "below," battery life can be preserved. With miniaturization of batteries, much power can be stored below.

In a further embodiment, power can be monitored so that when battery power is low, at least the first transceiver 50 might still have text sending capabilities, or text receiving capabilities. As will be apparent to those reasonably skilled in the art from the foregoing description, in this embodiment when the battery level of second transceiver 60 is determined to be too low, such as by falling below a predetermined threshold, then first transceiver 50 may be controlled to only operate in text sending and receiving modes, thereby preserving battery life for an extended period. In a similar but alternative embodiment, when the battery of the upper device, first transceiver 50, is determined to be too low, then the lower device, transceiver 60, may be controlled to go into this emergency text-only mode. In yet another alternative embodiment, the switching to text-only mode may occur in the same device that has the low battery, though there are disadvantages with this embodiment as explained below.

The switching to text-only mode may be achieved either manually, such as in response to a signal or alarm alerting the device operator, or may be achieved in a fully-automated manner. In the event the switching is automatically accomplished, there will also most preferably be an alarm or indicator that may be audible, visual, vibratory, or of other means that is indicative of the switching. In addition, there may also be provided an override capability, such that if the device operator so chooses, they may prevent the switching to text-only mode.

In a further embodiment, the emergency text-only mode may comprise additional power saving techniques applied to the active text-only mode device. For exemplary and non-limiting purpose only, these techniques may include shutting down unnecessary processor cores, slowing clock speed, and other techniques known in the field of computing for saving power.

This is a counter-intuitive procedure, as one might reasonably expect that the vulnerable phone or other transceiver would conserve its power automatically, rather than the paired phone or other transceiver. However, and particularly with older batteries, a low battery level in the currently transmitting and receiving device might afford a very short and unpredictable time period before a complete lack of power takes hold. Consequently, the amount of charge actually left and available in the heavily discharged device may not be sufficient for important safety functions. By switching the paired device to emergency text only mode, this preserves an extended and more certain window of time for emergency communications, and is particularly beneficial where such emergency communication are vital.

This emergency text-only mode switching also adds useful flexibility in the current and future multi-phone environment, where, for instance, consumers might rather, as a matter of routine, "run down" in one time stretch their high-powered applications on one particular phone, rather than time-curtail that full usage in any way. Further, as mobile devices, especially phones, continue to take on additional forms such as watches, and continue to support evermore spectacular broadband features for photos, games, sound, and other avenues, the power levels of devices will be taxed. The two-phone concept will be popular for its own artistic and efficiency reasons, and it will also bring power. This text-only mode switching can assist by letting the user know when power is coming to an end and still have some crucial text reserve, so that work or play can be concluded or other action taken.

Low battery power also might be sufficient to enable roaming power for someone to track the location of the transceiver. In addition to battery power or as an alternative thereto, power also may be taken and converted from, e.g., solar, locomotion, and use of incoming RF signals.

In another embodiment, the second transceiver 60 could undertake most or all of the intelligence/computing functions and send results as necessary upward to the first transceiver 50. In one such embodiment, the first transceiver 50 might primarily include the ability to receive and be in the form of, for example, an FM radio. Also, "lower" second transceivers could assist with storage, freeing up the upper first transceiver for other functions. For example, the upper device(s) might take and process photos, while the lower device(s) store(s) the photos.

In a further embodiment, the first transceiver 50 (upper device) can use power for photography, while the power and intelligence necessary for processing and storing the photography is done in the second transceiver 60 "below." In a further exemplary form, this embodiment has on-body telephone A, represented by transceiver 50, take a photo and then send it to on-body telephone B, represented by transceiver 60, for processing and storage. This could extend to multiple on-body phones, transceivers, or other accessory devices, and might further include different processes occurring in different devices. As will be apparent to those reasonably skilled in the art, this embodiment illustrates a multi-phone camera system that can take the present phone camera and make it more like a standalone camera. The system does so by adding greater traditional and future camera capability to the phone by offloading some of that capability to one or more other, on-body phones. While phone photos are becoming excellent, this system can improve them even further.

In this system, the particular handheld phone needs contain only so much intelligence and other resources necessary to capture the best photos, with the remaining resources placed within one or more other, on-body phones or other on-body devices. Phone designers, working within this framework, may begin to lessen the limitations currently found with phone "selfie" photos and the like, permitting the quality and functionality of phone photos to approach that of regular camera photos. One benefit available to a designer is the ability to keep the particular handheld(s) containing the portion(s) of the camera(s) taking the photos smaller and lighter. Another available benefit is that the ratio of processing intelligence can be split between phones, to maximize efficiency or other goals.

With the integration of more than one on-body photographic device into the system, a number of other features may also be provided. Some of these features are standard to existing cameras, but may for exemplary purposes require too much space or power to be suitable for integration with a telephone. As a result, in the prior art a telephone designer had to make trade-offs in the design between capabilities and features of the camera and available space and power in the telephone. In the present invention, these features may be divided between different on-body devices, allowing each to be of reasonable size and battery life, while collectively providing features found only in very high-end photographic equipment. For exemplary purposes only, and not limiting the present invention solely thereto, features that might be varied across different on-body devices include: the focal length of the camera lenses, including possible provision of optical zoom; lighting provisions including but not limited to pop-up flash and default types of flash such as red-eye reduction and fill-flash; shutter speed; wavelength of light imaged, such as visible, IR, or UV wavelengths; and view finders. Noteworthy here is that the selection of particular wavelengths across different cameras allows visual imaging with visible wavelengths, and thermal imaging with IR wavelengths.

Another special benefit may be achieved in this multiple camera embodiment. The provision of multiple lenses on different devices an be used to emulate "bumble bee" vision, 3D stereoscopic vision, and other special video effects.

In a further embodiment, the on-body provision of both a camera and significant processing power enables special synergy. A person, for exemplary purposes a military trooper, may use time-separated photographs of a particular location and adequate processing to display changes that have occurred in time. Again for exemplary and non-limiting purpose, a person might take a photograph of their house from the street before leaving. Upon returning, the person may take a second photograph, and at least one device in the present system will then first align the data, and then compare the data for material changes. This could, for example, emphasize footprints in the snow or mud that were not there in the earlier photograph.

Photo processing will be understood for the purposes of the present disclosure to be defined in accord with the following definition taken from Photokonnexion, and available at http://www.photokonnexion.com/: "In digital photography post-production, post-processing or simply processing refers to work that is done on the digital files after they have been captured by the camera. The processing stage is a term for all activities after shooting which lead to the completion of the work." For the purposes of the present disclosure, and also in accord with the general understanding in the photographic art, photo processing will be understood to specifically refer to work that in some way alters the digital content of the file. Examples of this processing include such actions as: decoding of image data; adjusting exposure, contrast and brightness; adjusting colors, hues, tones, saturation and light levels; file cropping; changing color, samples, hues, tones shades, lightening and darkening; resizing the file dimensions appropriated to an intended use; optimizing the file for example to remove unwanted data or reduce storage size; and retouching the subject content of the image, for exemplary purposes to remove dust spots, digital noise, known defective pixels, and other digital capture imperfections. Similarly, for the purposes of the present disclosure the definition for photographs and photography will also be understood to incorporate not only still photography, which is a subset of photography, but also motion photography, commonly referred to as movies or video. Consequently, the present invention will be understood by those reasonably skilled in photography to incorporate both still and motion photography.

In the embodiment of FIG. 2, there are two transceivers, which will assist reception by having two receivers total— one up as part of the first transceiver 50 and one down as part of the second transceiver 60. As discussed above, a third transceiver (or more), might be used for even better reception. Similarly, using multiple transmitters, including transmission in tandem, can result in a more effective and powerful transmission. This might, for example, double or triple the power, and be especially helpful for Federal Military or Federal Park operations. Where a plurality of devices are operating in tandem for transmission or reception, and when desired, one device may be used solely for the control of the tandem arrays, and optionally might not participate in the tandem transmissions.

In one exemplary embodiment, a plurality of on-body transceivers will communicate through mobile relays, such as might for exemplary purpose be provided on Unmanned Aerial Vehicles (UAVs). In this embodiment, the combinations of the plurality of on-body transmission sources and plurality of UAV repeaters facilitates advanced communications and helps thwart signal jamming.

In another embodiment, at least the second transceiver might contain alarms. These alarms might include audible and/or visible signals which signal when the first transceiver is switched for use as a conventional cellular telephone. The alarms also might signal when lower RF use is activated, yet the two (or more) transceivers are separated to too great of an extent; or when one of the transceivers is not powered on, or is underpowered. For exemplary and non-limiting purposes, if a person were to walk away from one of the devices while still carrying the second device, an alarm would then signal for a predetermined time once the distance reached a predetermined threshold. As may be apparent, this greatly assists with the management of multiple devices, protecting against the unintentional or malicious losses that might otherwise occur.

In one embodiment, two or more devices may be provided with GPS position determination capability. In this embodiment, the GPS position reckoning may be used to determine device separation, and when a threshold is reached, trigger an alarm. Where the nature of a device permits, the GPS position reckoning may also then be used to track and locate the separated device.

In one embodiment, when a device is separated from the remaining devices in the system for a significant time period, it will preferably turn off rather than futilely drain the battery. A significant time period in this context will be understood to be more than the time required for a person to detect the absence of the device, and an adequate time period to locate the device.

In another alternative embodiment, and further exemplifying the possible synergies amongst the multiple devices, only one device has an active GPS position determination capability. Other devices will either be controlled to inactivate their GPS systems, or will not be provided at all with a GPS reckoning system. The position information is shared from the active GPS device to the remaining devices, thereby reducing power consumption in the devices with inactivated or absent GPS systems. This also enables accessory devices to be used in the present system that have both less complexity and lower power consumption.

Also, the system can be programmed not to work in full power (not lowered) mode, or not to work without, e.g., passwords, if the transceivers are separated for a length of time. As an alternative to an alarm, or in conjunction therewith, when the first transceiver 50 is switched for conventional use, or for any of the other embodiments when the second transceiver 60 is activated, either the first transceiver 50, the second transceiver 60 or both might function with adaptive power control in order to vary power to less than or equal to 1.6 W/kg (or to a higher limit, as previously noted). In this way, the RF is monitored and when an upper limit is reached (e.g., greater than 1.6 W/kg) the cellular telephone could drop a call or power off to prevent the exposure to the higher RF levels.

In another embodiment, the first transceiver 50 might be configured to switch from receiving signals from the second transceiver 60 and receive signals from a permanently mounted device such as a femtocell, picocell, or microcell (and switch again) as illustrated in step 150 of FIG. 3. In this embodiment, the second transceiver 60 would shut-off, or in an alternative embodiment operate in a stand-by mode as illustrated in step 160 of FIG. 3. In one embodiment, this switch in reception is automatic. In an alternative embodiment, the availability of the femtocell may be signaled or otherwise indicated to a person using any suitable alarm or indicator, and the user may then interact through an electrical input device to indicate an election to switch or not.

In a further alternative embodiment, preferences for suitable femtocell or like networks will be established and electronically stored. Transceivers 50, 60 may then automatically switch or not in the presence of a specific femtocell or like network responsive to the stored preferences. As an ancillary, the preferences may also include an indication of whether, in the presence of a specific femtocell or like network, one or more transceivers such as transceivers 50, 60 should switch to a more secure or "hardened" mode responsive to a switch to all or particular ones of femtocells or like networks.

In another alternative embodiment, second transceiver 60 may automatically continue seamlessly on the newly encountered femtocell or like network. In this embodiment, a simple hand-off is effected, while not changing the operation of first transceiver 50.

In a yet further alternative embodiment, both transceivers 50, 60 may switch to the encountered femtocell or like network. In such instance, transceivers 50, 60 may operate in parallel and any data losses due to poor signal reception or transmission may be detected and corrected through the availability of duplicate signal transmission and reception.

In this manner, the present invention does not merely use the femtocell concept in a routine fashion, as it might in a one-phone environment. Instead, one phone will go into standby mode and shift the signal to the other for direct femtocell use. This automatic feature can reduce RF radiation exposure. The femtocell environment in general already provides a lower RF radiation environment than does the usual cell phone environment, but the subject feature may in one embodiment use the multi-phone concept to switch the remaining RF radiation exposure from outgoing transmissions to a lower body part for even greater safety, while saving device power vis-à-vis the other phone. Also, flexibility in usage can be achieved; for instance, usage can be switched automatically to, e.g., a "hardened" phone when a femtocell environment is encountered, reducing the risk of data loss from use of an unfamiliar, third-party femtocell network.

In accord with the teachings of the present invention, there may also be configured a special case femtocell, where the femtocell exists within a shielded enclosure. For exemplary and non-limiting purposes, an automobile may be provided with RF shielding, so that a femtocell within the automobile is only accessible internally. In such case, communications amongst devices within the femtocell are particularly secure. In the exemplary automobile, control of the automobile may be relinquished to a secondary device only when that secondary device is within the femtocell. In the multiple device configurations of the present invention, each device may be required to be present within the femtocell. This requirement significantly increases the security of the special case femtocell.

A number of similar security features may be provided or enhanced by the multiple device configuration of the present invention. As noted with the special case femtocell, each of the devices may be required to be present and polled. Similarly, when devices of the present system are separated from each other, and as described herein above, the devices may be turned off or disabled from one or more functions. Security portals may likewise require presence of the plurality of devices. As an ancillary thereto, since the plurality of devices are spatially separated by a small distance, such as on a wrist and ankle for exemplary purposes, this may be used as further confirmation that the proper devices are present in proper location.

In another embodiment, location monitoring accuracy may also be greatly improved through the improved triangulation provided by multiple devices. This improved triangulation is not only beneficial for security purposes, but can also provide advanced assistive technology, such as assisting a blind person in moving about or in providing emergency assistance through more precise location determination. Further, in the event of a failure of one device to communicate with emergency services, the second device may provide the vital communications link.

In yet another embodiment, each device in a system may store only a portion of the data comprising one or more files. The loss or hacking of a single device does not compromise the data in such a case.

In addition to the other apparatuses described herein above, and in accord with a further embodiment, one or more of the various devices in the present system may be provided with a variety of other features or capabilities. Exemplary, but not limiting the present invention solely thereto, are such features as: the provision of waterproof or water-resistant housings; radio reception that may include AM, FM, and other broadcasts; music players; calendars and other software applications; removable data storage media; secured or "hardened" data storage areas; suitable input and output (I/O) ports; and docking software/hardware to allow data transfer.

Another embodiment is directed to a method of use. The method reduces RF radiation exposure at an upper portion of a body of a user of a mobile device and includes locating a transceiver on a portion of the body of the user that is lower than the upper portion of the body of the user; communicating low-power, short-range RF communication signals between the transceiver and the mobile device; boosting a signal strength of the short-range RF communication signals at the transceiver to a range that is within permissible specific absorption rate (SAR) levels as established by the Federal Communication Commission (FCC), that is, up to 1.6 W/kg at the head, or greater; and transmitting high-power, long-range. RF communication signals to a wide area network using the transceiver, so that the RF radiation exposure at the upper portion of the body of the user is reduced. Of course, the method also includes modifications as discussed above in connection with each of the system embodiments.

The disclosed embodiments provide at least two transceivers that are configured to push RF radiation toward the lower extremities and away from the brain, eyes, and groin. In addition to reduced RF exposure, the devices provide advantages, including having settings that result in prior art use of at least one of the devices. Further, the position of the second device "below" enables the system to use low RF on, near or adjacent to the upper body and boost it "below" to normal strength associated with permissible SAR and/or boost it to a larger SAR limit (FCC) due to exceptions in regulations for ankle and foot SAR. Since some functions are done "below," the power for these functions comes from the lower battery or batteries or other low power sources so that power can be preserved. Miniaturization of batteries will likely assist in this. The "lower" device(s) can also assist with storage and intelligence/computing/processing, freeing up the first device for other functions. In this way, the upper device might resemble the so-called "Dick Tracy" watch (phone) in which all intelligence/processing is done at the "lower" device and not at the phone (mobile device). Further, using a second device, on the lower extremities, can assist reception by having at least two receivers.

Although the above embodiments have been described in detail, those of ordinary skill in the art should understand that they could make various changes, substitutions and alterations herein without departing from the intended scope.

What I claim is:

1. A method of using two discrete mobile devices to switch between communicating through a cellular long-range communications tower and communicating through a local femtocell existing within a shielded enclosure, comprising the steps of:
    locating a first one of said two discrete mobile devices adjacent a portion of the body of the user;
    transmitting from said first one of said two discrete mobile devices through first high-power, long-range RF communication signals through said cellular long-range communications tower to a remote recipient;
    detecting presence within said shielded enclosure of both of said first one of said two discrete mobile devices and a second one of said two discrete mobile devices; and
    switching said first one of said two discrete mobile devices from said communicating through said first high-power, long-range RF communication signals to communicating with said remote recipient through said femtocell existing within a shielded enclosure, said switching step only occurring responsive and subsequent to said detecting step.

2. The method of using two discrete mobile devices to switch between communicating through a cellular long-range communications tower and communicating through a local femtocell existing within a shielded enclosure of claim 1, further comprising the steps of:
    communicating low-power, short-range RF communication signals between said first one of said two discrete mobile devices and said second one of said two discrete mobile devices; and
    generating first high-power, long-range RF communication signals at said second one of said two discrete mobile devices from said low-power, short-range RF communication signals prior to said detecting step.

3. The method of using two discrete mobile devices to switch between communicating through a cellular long-range communications tower and communicating through a local femtocell existing within a shielded enclosure of claim 2, wherein said switching step further comprises switching said first one of said two discrete mobile devices from said communicating low-power, short-range RF communication signals between said first one of said two discrete mobile devices and said second one of said two discrete mobile devices to said first one of said two discrete mobile devices communicating with said remote recipient directly through said local femtocell existing within a shielded enclosure.

4. The method of using two discrete mobile devices to switch between communicating through a cellular long-range communications tower and communicating through a local femtocell existing within a shielded enclosure of claim 3, further comprising the step of shutting off said second one of said two discrete mobile devices responsive to said switching step.

5. The method of using two discrete mobile devices to switch between communicating through a cellular long-range communications tower and communicating through a local femtocell existing within a shielded enclosure of claim 3, further comprising the step of operating said second one of said two discrete mobile devices in a standby mode responsive to said switching step.

* * * * *